July 19, 1966    H. J. YOST ET AL    3,262,112
TIME COMPENSATION FOR DOPPLER FREQUENCY
Filed March 31, 1964
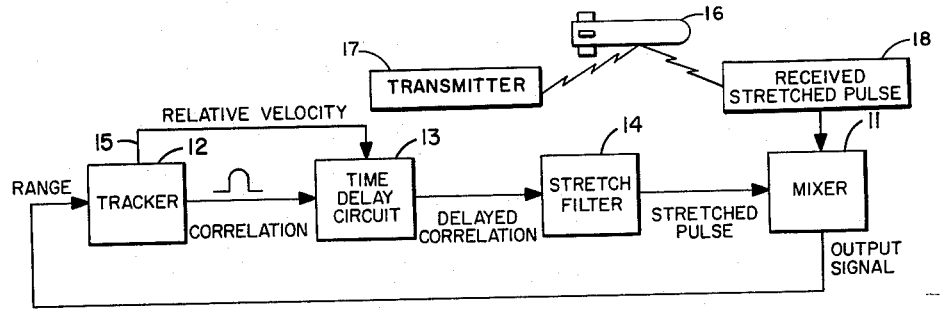
FIG. I
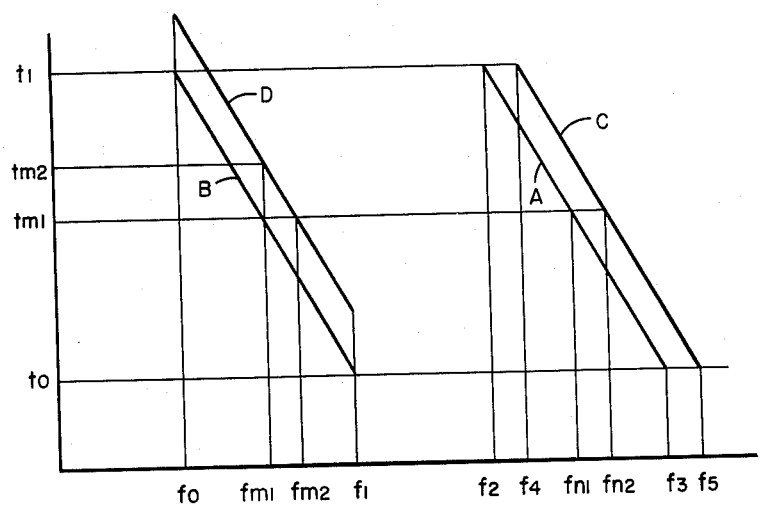
FIG. 2
Herman J. Yost
Bernard L. Harris
John W. Taylor,
        INVENTORS.
BY Harry M. Saragovitz
   Edward J. Kelly
   Herbert Berl
   Robert C. Sims
            ATTORNEYS

3,262,112
TIME COMPENSATION FOR DOPPLER FREQUENCY
Herman J. Yost, Ellicott City, and Bernard L. Harris and John W. Taylor, Baltimore, Md., assignors, by mesne assignments, to the United States of America as represented by the Secretary of the Army
Filed Mar. 31, 1964, Ser. No. 356,332
8 Claims. (Cl. 343—14)

This invention relates generally to a linear FM radar system which is used as a range tracker. More particularly this invention relates to a radar system which produces a correlation pulse at the proper time, such that when it is pulse stretched, it will mix with the return in the receiver and produce a signal of constant frequency.

In theory, a range tracker of a linear FM radar could properly track a moving target. In doing so, though, the range predicted would differ from the actual by the offset in time due to Doppler frequency shift. Frequency compensation to account for this offset caused by Doppler frequency shift would be difficult to add in a coherent radar system. Further the phase coherence of the frequency compensation would have to be maintained.

It is, therefore, an object of this invention to provide a linear FM radar system suitable for use as a range tracker.

Another object of this invention is to provide a means of Doppler correction of the utmost simplicity.

A still further object of the present invention is to shift accurately a reference frequency without destroying its phase coherence.

These and other objects and advantages of the present invention will become apparent from the following detailed description and from the accompanying drawings, in which:

FIGURE 1 illustrates a system, in block diagram, according to a preferred form of the present invention; and FIGURE 2 illustrates the time vs. frequency characteristics of the return signal and of the correlation signal.

For a linear FM system, the received signal from a target has a time vs. frequency characteristic as shown in FIGURE 2. The return from a fixed target is described by line A and is:

(1) $$t = \frac{(t_1 - t_0)}{f_3 - f_2}(f_3 - f) + t_0$$
$$f_2 \leq f \leq f_3$$

where $t$ = time; $f$ = frequency

It is therefore a linear function centered about $f_{n1}$ and $t_{m1}$.

A correlation pulse of the same form is produced in the receiver at a different center frequency. It has the form:

(2) $$t = \left(\frac{t_1 - t_0}{f_1 - f_0}\right)(f_1 - f) + t_0$$
$$f_0 \leq f \leq f_1$$

and is shown as line B in FIGURE 2 centered about $f_{m1}$ and $t_{m1}$. It is seen that when the two are mixed together the result is a signal of constant frequency, $f_{n1}$, between $t_0$ and $t_1$.

The tracker does just this on a fixed target. It produces a correlation pulse at the proper time, such that when it is pulse stretched, it will mix with the return in the receiver and produce a signal of constant frequency.

On a moving target the Doppler effect would cause the received returned signal pulse to be shifted in frequency as shown by line C. The difference, i.e., the Doppler frequency, is given by:

$$F_d = f_{n2} - f_{n1} = f_5 - f_3 = f_4 - f_2$$

where $F_d$ = the Doppler frequency

The tracker may then compensate for the Doppler by shifting the correlation pulse in time, as shown by line D of FIGURE 2. By this method it maintains the constant frequency difference between the return form and the correlation form.

Mathematically this is shown by substituting $$f + (f_{n2} - f_{n1})$$

for $f$ in Equation 1 and substituting $t + (t_{m2} - t_{m1})$ in Equation 2. The result is two lines displaced by $$(f_{n2} - f_{m2})$$

It is identical to the case of the fixed target provided the time compensation used is:

$$T = t_{m2} - t_{m1} = \left(\frac{t_1 - t_0}{f_1 - f_0}\right)(f_{m2} - f_{m1})$$
$$= \left(\frac{t_1 - t_0}{f_1 - f_0}\right)(f_{n2} - f_{n1}) = \left(\frac{t_1 - t_0}{f_1 - f_0}\right) F_d$$

where $T$ = time delay which gives the desired relationship between the Doppler frequency and time.

In this equation because the term $$\left(\frac{t_1 - t_0}{f_1 - f_0}\right)$$

is a fixed value in a given system, substitution of a value of Doppler frequency caused by a moving target will result in determining the proper time delay to compensate for the Doppler frequency.

The block diagram of FIGURE 1 comprises a mixer 11 having two inputs and an output. One input is fed with a return stretched pulse from the target 16. The other input of the mixer is fed with a correlation signal. The output of mixer 11 is fed to the input of a tracker 12. Tracker 12 has circuitry for indicating the range of the target, determining the relative velocity of the target, producing a relative velocity signal which is proportional to the relative velocity of the target, and producing a correlation signal. A time delay circuit 13 is shown having two inputs; one connected to the correlation signal output of tracker 12; and another connected to the relative velocity signal output 15 of the tracker. The output of the time delay circuit is connected to the input of mixer 11 by way of stretch filter 14.

After transmission by transmitter 17 of a stretched pulse a received stretched pulse is received by mixer 11 by way of receiver circuits 18. The mixer 11 mixes the stretched pulse output from stretch filter 14 and the received stretched pulse. The change in frequency of the output signal of mixer 11 in time provides tracker 12 with sufficient information to determine the relative velocity of the target. Tracker 12 will have an output 15 which is proportional to this velocity. The amount of output 15 determines the amount of time delay to be caused by time delay circuit 13. Thus the correlation pulse, which under a no moving target condition would pass undelayed through the time delay circuit, will be delayed an amount proportional to the velocity of the target when relative movement is detected by the tracker. The result is that the linear FM pulse created by the stretch filter has the characteristics of the received stretched pulse; therefore the results of mixing, in a moving target case, are identical to those of the non-moving target case. The tracker will now be able to determine the true range of the target by just sensing the output frequency of mixer 11.

While the invention has been described with reference to a preferred embodiment thereof, it will be apparent that various modifications and other embodiments thereof will occur to those skilled in the art within the scope of the invention. Accordingly, we desire the scope of our invention to be limited only by the appended claims.

We claim:

1. A radar system comprising in combination a mixer having a first input, a second input and an output; said first input being connected to a source of received signals; a tracker having a first output, a second output and an input; said input of the tracker being connected to the output of said mixer; the first output of said tracker being a signal to be correlated with the received signals in the mixer; the second output of said tracker being responsive to the output of the mixer to produce a signal which is proportional to changes in said mixer's output; a time delay circuit having a first input, a control input and an output; means connecting the first output of said tracker to the first input of said delay circuit; means connecting the output of said delay circuit to the second input of said mixer; and means connecting the second output of the tracker to the control input of said delay circuit.

2. A system as set forth in claim 1, wherein said source of received signals provides a pulsed signal derived from the reflection of a target of a pulsed signal transmitted by a linear FM radar system; and said first output of said tracker is a correlation pulse such that when the two pulses are mixed in the mixer a constant frequency output which is proportional to a range of the target results.

3. A system as set forth in claim 2, wherein said tracker contains circuitry which senses changes in said constant frequency output to produce at the second output of the tracker a signal which is proportional to relative velocity of the target and the radar system.

4. A system as set forth in claim 3, wherein said time delay circuit is so constructed that, upon receiving a signal at its control input which is proportional to the velocity of said target, it will time delay the correlation pulse output of the tracker sufficient to compensate for an error caused by Doppler frequency.

5. A system as set forth in claim 2, wherein said pulsed received signal is a stretched pulse.

6. A system as set forth in claim 5 further comprising a stretch filter connected between the output of said time delay circuit and said second input of said mixer.

7. A system as set forth in claim 3, wherein said pulsed received signal is a stretched pulse, and further comprising a stretch filter connected between the output of said time delay circuit and said second input of said mixer.

8. A system as set forth in claim 4, wherein said pulsed received signal is a stretched pulse, and further comprising a stretch filter connected between the output of said time delay circuit and said second input of said mixer.

References Cited by the Examiner

UNITED STATES PATENTS

| | | | |
|---|---|---|---|
| 2,834,956 | 5/1958 | Harris | 343—14 |
| 3,199,105 | 8/1965 | Lakatos | 343—17.2 |
| 3,199,106 | 8/1965 | Karr | 343—17.2 |

CHESTER L. JUSTUS, *Primary Examiner.*

R. E. KLEIN, P. M. HINDERSTEIN,
*Assistant Examiners.*